(12) United States Patent
Morin et al.

(10) Patent No.: US 7,942,093 B2
(45) Date of Patent: May 17, 2011

(54) AUTOMATIC BREWED BEVERAGE DISPENSER COMPRISING AN INFUSED PRODUCT EJECTING DEVICE

(75) Inventors: Gilles Morin, Saint Honorine du Fay (FR); Severine Mih, Mayenne (FR)

(73) Assignee: SEB S.A., Ecully (FR)

( * ) Notice: Subject to any disclaimer, the term of this patent is extended or adjusted under 35 U.S.C. 154(b) by 729 days.

(21) Appl. No.: 11/720,986

(22) PCT Filed: Dec. 2, 2005

(86) PCT No.: PCT/FR2005/003020
§ 371 (c)(1),
(2), (4) Date: Jun. 6, 2007

(87) PCT Pub. No.: WO2006/061494
PCT Pub. Date: Jun. 15, 2006

(65) Prior Publication Data
US 2009/0223374 A1  Sep. 10, 2009

(30) Foreign Application Priority Data

Dec. 6, 2004 (FR) ...................................... 04 12941
Apr. 7, 2005 (FR) ...................................... 05 03491

(51) Int. Cl.
*A47J 31/41* (2006.01)
*A47J 31/40* (2006.01)

(52) U.S. Cl. ............................... 99/287; 99/280; 99/297

(58) Field of Classification Search .................... 99/287, 99/279, 289 R, 289 T, 289 D, 289 P, 297, 99/316, 317, 319, 320; 426/433
See application file for complete search history.

(56) References Cited

U.S. PATENT DOCUMENTS
4,796,521 A    1/1989  Grossi
(Continued)

FOREIGN PATENT DOCUMENTS
EP          0117583 A       9/1984
(Continued)

OTHER PUBLICATIONS

Albert Allis Hopkins, Alexander Russell Bound: "Scientific American Reference Book, A manual for the office, household and shop", Munn & Company, 1905, pp. 428-432.*

*Primary Examiner* — Quang T Van
*Assistant Examiner* — Jianying Atkisson
(74) *Attorney, Agent, or Firm* — Browdy and Neimark, PLLC

(57) ABSTRACT

The invention relates to an automatic dispenser for infused beverages made from powdered coffee or from pre-packaged capsules comprising, inside a housing: an infusion group (1) containing an infusion chamber (2) having a bottom and an opening (3) and being able to receive a pressing plunger (5), actuating means (7) for effecting a sliding movement relative to the pressing plunger (5) and/or said infusion chamber (2) relative to one another, starting from a position of rest, in which the plunger is located outside the chamber, and up to a working position inside the infusion chamber, and an ejecting plate mounted inside the infusion chamber (2) in a manner that enables it to be displaced between the bottom and the opening (3) of the latter by means of a drive device, and; a device (20) for ejecting the cake consisting of coffee grounds or ejecting infused capsules when said ejecting plate is brought to the level of the opening (3) of the infusion chamber (2), this ejecting device comprising an ejecting arm (21) placed in alternating motion above the opening (3) of the infusion chamber (2). According to the invention, the ejecting arm (21) is mounted in a manner that enables it to rotate about a pivotal axis (24) perpendicular to the plane of the opening (3) of the infusion chamber (2) and it is driven in its alternating motion by a single cam (30) that can move with the pressing plunger (5) or with the infusion chamber (2) whose profile is such that it ensures the two-way displacement of the ejecting arm.

8 Claims, 2 Drawing Sheets

U.S. PATENT DOCUMENTS

| | | | |
|---|---|---|---|
| 4,852,472 A * | 8/1989 | In-Albon et al. | 99/289 R |
| 5,255,594 A | 10/1993 | Grossi et al. | |
| 5,406,882 A * | 4/1995 | Shaanan | 99/287 |
| 5,479,848 A | 1/1996 | Versini et al. | |

FOREIGN PATENT DOCUMENTS

| | | | |
|---|---|---|---|
| EP | 117583 A * | 9/1984 | |
| EP | 1477092 A2 * | 11/2004 | |
| WO | 0143610 A | 6/2001 | |
| WO | 2005034696 A1 | 4/2005 | |

* cited by examiner

AUTOMATIC BREWED BEVERAGE DISPENSER COMPRISING AN INFUSED PRODUCT EJECTING DEVICE

The present invention relates to an automatic dispenser of brewed beverages starting from granular foodstuff for infusion or percolation, such as ground coffee, tea, chocolate, etc. in bulk or pre-packaged in capsules.

An appliance for preparing and dispensing hot beverages generally comprises a cold water reservoir, an electric pump, an assembly forming a boiler and a brewing head adapted to receive a predetermined quantity of product in powder, or ground, form, even a flexible or rigid capsule containing such a product. Hot water coming from the boiler is sent under pressure into the brewing head, the beverage obtained being then directed towards a collecting receptacle. At the end of the infusion cycle, the remains of the infused product or the used capsule is evacuated and the brewing head is open in order to be able to introduce infusion product anew. To this end, automatic beverage dispensers are generally provided with an automatic device for automatic ejection of the infused product, coffee grounds disc or capsule, device that is driven by mechanisms within the appliance.

The document WO 99/12455 describes an automatic group for preparation of brewed beverages comprising a device for ejecting coffee grounds discs. This automatic group comprises a body containing a brewing chamber having a vertical axis presenting an opening, comprising an ejecting plate movably mounted in the chamber, and receiving a mobile infusion piston mounted to be vertically movable, as well as a device for ejecting coffee grounds discs when they are pushed in the upper position of the chamber by the ejecting plate. The ejecting device comprises a discharge drawer forming a scraper mounted to slide horizontally, at the level of the opening of the brewing chamber, on slides provided on the edge of the opening. The actuation of the drawer is ensured by a mechanism for transformation of the movement of the infusion piston, in particular a linkage, fixed to the piston rod and comprising a protuberance that acts on an articulated rod of which one of the ends is connected to a push rod of the discharge drawer. The return of the drawer to the withdrawn position is ensured by a return spring. This device, although effective for the expulsion of the grounds disc, presents as a principal disadvantage that of requiring many parts fabricated with very strict manufacturing tolerances, without which the drawer is prone to frequent jamming in its slides.

In addition, the document FR 2 594 671 describes an automatic coffee machine comprising a vertical brewing chamber with a movable bottom and receiving an upper tamping piston mounted to be vertically movable. The brewing chamber belongs to a fixed block that also supports the motor block for driving two platens, upper and lower, slidably mounted on vertical columns. The upper platen carries the tamping piston and the lower platen carries the rod of the movable bottom of the chamber. The platens are driven in movement by vertical toothed racks that receive the movement of a pinion mounted on the output shaft of the motor. This pinion also drives in translation a horizontal toothed rack of which one of the ends is in abutment against a transverse protuberance of a scraper mounted for lateral sweeping above the brewing chamber. The scraper is driven by the horizontal toothed rack in an angular lateral sweeping movement starting from a fixed pivot axis constituted by one of the columns for guiding the platens. By its lateral sweeping movement, the scraper allows the evacuation of the brewed grounds disc lifted at the end of the cycle by the rise of the movable bottom of the brewing chamber. The return of the scraper to its initial position is effected under the force of a return spring. This automatic machine describes, certainly, a device for ejection by sweeping with a pivotal movement more reliable than the preceding, but at the price of a mechanical actuation with a motor and several rack and pinion mechanisms that make the construction complex and cumbersome. In addition, the return spring can be blocked in operation and its force further acts against the actuation motor of the machine.

The document EP 0 270 141 describes an automatic coffee machine comprising a plate that is movable by pivoting with the piston and driving a scraping blade for ejecting coffee ground discs. However, the scraping blade pivots around an axis parallel with the plane of the opening and not perpendicular thereto.

The document EP 0 117 583 describes an automatic mechanism for the production of espresso coffee, but where the "puck" ejection mechanism comprises an ejector arm mounted pivotingly around an axis parallel with the top of the opening of the brewing chamber. The actuation of the pressing plunger, which moves in its turn the ejector arm, is effected by a complex and cumbersome drive mechanism.

The document WO 01/43610 describes an automatic coffee machine comprising a brewing group where a filter plate is movably mounted inside a brewing chamber to allow the ejection of grounds by an ejector. However, no indication is given in this document regarding the structure or the operation of the ejector.

The U.S. Pat. No. 5,255,594 describes an automatic coffee machine comprising a blade for scraping the grounds, blade driven by a plate that is displaced with the piston in a pivoting movement around an axis parallel to the plane of the opening of the brewing chamber.

The U.S. Pat. No. 5,479,848 describes an automatic coffee machine comprising a device for ejecting coffee grounds by pivoting of an articulated arm around an axis perpendicular to the plane of the opening of the brewing chamber. However, actuation for pivoting in a vertical plane of the articulated arm is effected by a groove of a rod movable horizontally with the filling chamber, and not with the piston or the brewing chamber.

The U.S. Pat. No. 5,406,882 describes a machine for preparation of brewed beverages comprising an arm for ejection of the brewed product driven with a lateral pivoting movement above the opening of the brewing chamber, by being driven by a part movable with the brewing chamber. However, the ejection arm is driven only at the time of its return movement by the displacement of the chamber, its forward movement using the energy of a spring.

The goal of this invention is to remedy the above mentioned disadvantages and to offer an automatic dispenser of brewed beverages of simplified construction and operation, while being particularly reliable.

Another goal of the invention is an automatic dispenser of brewed beverages adapted to ensure the ejection of an infused grounds disc or a used capsule in a fast and reliable way over time, being able to be industrialized at a lower cost.

These goals are achieved with an automatic dispenser of beverages brewed starting from coffee powder or packaged capsules comprising, inside a housing:
   an infusion group comprising a brewing chamber presenting a bottom and an opening and being adapted to receive a pressing plunger, means for actuation in a relative sliding movement of said pressing plunger and/or said brewing chamber one with respect to the other, starting from a rest position in which the plunger is outside the chamber to a work position inside the brewing chamber, and an ejector plate movably mounted in said brewing chamber, between the bottom and the opening of the latter by means of a driving device;

as well as a device for ejection of discs of grounds or infused capsules, when said ejector plate is brought to the level of the opening of the brewing chamber, comprising an ejector arm driven in a reciprocating motion above the opening of the brewing chamber, by the fact that the ejector arm is mounted to rotate around a pivot axis perpendicular to the plane of the opening of the brewing chamber and that it is entrained in its reciprocating motion by only one cam movable with the pressing plunger or with the brewing chamber whose profile is such that it ensures displacement of the ejector arm in two opposite directions.

Such a brewed beverage distributor can be a coffee machine that makes coffee of the espresso type by sending hot water under pressure through coffee grounds contained in the chamber or inside a capsule containing the coffee, then evacuates the brew obtained to the outside the appliance, where it is collected in a cup. Such an appliance comprises moreover a device for ejecting the infused grounds "puck" or the used capsule when it has been brought to the level of the opening of the brewing chamber by an ejector plate, slidably mounted inside the latter by being actuated at the end of the infusion cycle by a driving device. The ejecting device comprises an ejector arm that undergoes periodic movements, back and forth above the opening of the brewing chamber so as to push the "puck" or used capsule to send it towards a collecting compartment, or tank, and to return then into a position that is withdrawn relative to the opening of the chamber. The ejector arm can carry out a rotational or translatory movement above the opening of the brewing chamber, movement which can be parallel or tangential to the plane of the opening.

According to the invention, the drive of the ejector arm in its forward and back displacements, is effected by a double acting cam movable with the piston or the brewing chamber. This already makes it possible to simplify the construction of the drive mechanisms for the ejection device by replacing them with only one cam that does not need its own drive means, because it is fixed to the parts in sliding motion, in particular the pressing plunger or the brewing chamber. In addition, the profile of this cam is such as it ensures the driving of a movement in both directions, forward and return, of the ejector arm, which makes it possible to eliminate any return means, in particular cumbersome springs, prone to blockages and consumers of energy. Thus, the same part is adapted to ensure all displacements of the ejector arm, in a simple and highly reliable manner in operation.

Advantageously according to the invention, said ejector arm is mounted rotatably around a pivot axis perpendicular to the plane of the opening of the brewing chamber.

One could, certainly, have envisioned an ejector arm having a sliding drawer movement above the opening of the brewing chamber, or even an ejector arm pivoting around an axis parallel with the plane of the opening, having thus a tangential movement. There is preferred however an ejector arm pivoting around a transverse axis in the plane of the opening, this ensuring a movement having lateral stability, carried out parallel to the plane of the opening. This allows, for a small angle of displacement impressed on the one of the ends of the ejector arm, to obtain a broad sweeping of the other end, and, consequently to correctly push a disc or used capsule towards a collecting compartment.

Preferably, the cam is fixed to the pressing plunger and comes to engage directly with a drive end of the ejector arm.

Thus, the cam is linked to the sliding movement of the pressing plunger so that the ejector arm moves from a withdrawn position relative to the opening of the chamber in which the pressing plunger is inside the brewing chamber, to a final ejection position above the opening of the brewing chamber in which the pressing plunger is outside the brewing chamber. This driving of the ejector arm is done directly by the cam, without any interposed part, for a simplified construction.

Preferably, the pivot axis of the ejector arm is adjacent the drive end of the arm.

One thus arranges the pivot axis of the ejector arm closest to its drive end in order to achieve an amplification of its displacement. Advantageously, the cam is flat.

One could, certainly, have envisioned using a cam with protuberances in relief coming to push the drive end of the ejector arm. There is preferred however a flat cam, being able to be easily made starting from a plate, then driven in a reciprocating translatory movement by the mobile piston, this cam being then very compact.

Preferably, the cam presents a guide path made up of two straight parallel parts and connected to one another via an oblique part forming an angle ranging between 40° and 60° with the straight parts.

The oblique part of the cam allows a change of position of the ejector arm between its withdrawn position and that of sweeping or expulsion of a disc or capsule, whereas the straight parts ensure a maintenance in position of the ejector arm during translatory movement of the piston, and thus of the cam. The angle of the oblique part of the cam has been calculated so that the displacement of the drive end of the ejector arm can ensure, for a small displacement by the cam, a full and fast movement of the ejector arm above the opening of the brewing chamber.

Advantageously, the guide path is a rib, or strip, on which moves a fork forming the drive end of the ejector arm.

The drive end of the ejector arm could have been made in the shape of a lug coming to be inserted in a guide path in the form of a groove of the cam. One prefers however to make this end in the form of a fork that surrounds a rib of the cam, because such a fork resists better the mechanical stresses experienced during operation, in particular friction and abrupt changes in the direction of displacement of the ejector arm.

Preferably, the rib is covered with a plate with round edges made of a plastic.

The rib can be made from a metal plate that is then covered with a plate made of a plastic and having rounded edges, without sharp edges. Such a construction ensures at the same time a good mechanical strength, and a good slidability, without wedging, of the fork of the ejector arm relative to this cam rib, the material of the coating having preferably a low coefficient of friction.

Advantageously, the means for actuation of the pressing plunger comprise a hydraulic actuating cylinder, or jack, having a jack rod provided at one of its ends with a support that carries said pressing plunger and said cam.

Such a hydraulic actuating cylinder can be supplied in an advantageous way by a hydraulic system originating from the pump of the dispenser, thus avoiding using an electric motor, more cumbersome and noisy. The rod of this jack then drives the pressing plunger and at the same time, via a common support, the cam for actuation of the ejector arm.

Preferably, the cam is held within an ejector guide fixed at the one of the ends of the support opposed to that carrying the pressing plunger.

The ejector guide is a framework (opened or closed) that carries the cam at the interior, in particular the guide path of the latter. This ejector guide is then fastened at the greatest possible distance from the brewing chamber in order to allow a greater movement of the ejector arm which follows the cam.

The invention will be better understood from a study of the embodiment taken on a nonlimiting basis and illustrated in the annexed figures in which.

Figure 1:
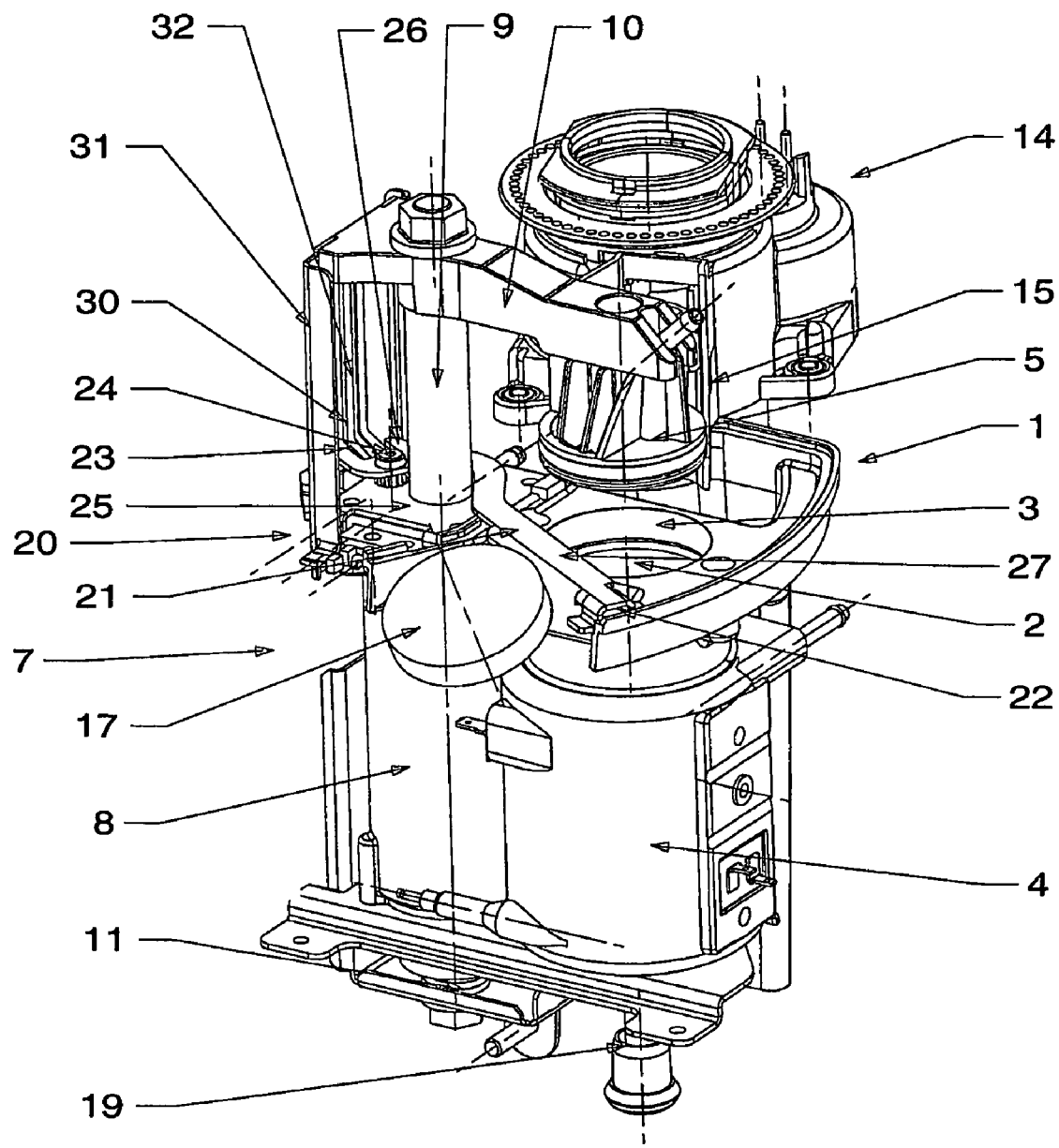
FIG. 1 is a perspective view of an automatic dispenser according to the invention, certain of its components being omitted for greater clarity.

The automatic dispenser shown in FIG. 1 is an automatic coffee machine adapted to make an espresso coffee and it comprises a housing (not shown in the figure) whose bottom forms a support for the components of the appliance which will be described hereafter, some of the components of the machine being removed in order to more easily be able to identify its principal functional elements as well as those representative of the invention. In FIG. 1, a brewing group 1 comprises a brewing chamber 2 in the form of a cylindrical tank adapted to receive a certain quantity of ground coffee above a lower wall forming a filter for the grounds. Brewing chamber 2 is fixedly mounted above a thermal block 4, having a vertical axis, of which it constitutes the prolongation. Thermal block 4 contains a water circuit and an electric heating element not shown, but which can be fabricated according to the description in document WO 99/12456. Thermal block 4 ensures the supply of hot water for brewing chamber 2.

Brewing chamber 2 receives a pressing plunger 5 that slides vertically and in a sealed manner in brewing chamber 2 to compact the grounds. The appliance in addition comprises means 7 for actuating pressing plunger 5 which are made up, in the example represented, by a hydraulic actuating cylinder 8 comprising an internal piston prolonged by a jack rod 9 connected to pressing plunger 5 by a rigid intermediate bar or support 10. Hydraulic actuating cylinder 8 receives a liquid under pressure, in this case water, coming from a hydraulic circuit of the appliance, liquid that moves the piston of the jack to the bottom at the same time as pressing plunger 5 which passes then from a rest position (in the upper part of the appliance) to a work position, by descending vertically in the direction towards brewing chamber 2 to compress the grounds. Hot water is then sent by a pump through the grounds and the brewed beverage is then evacuated through the pressing plunger 5, via an internal channel of the latter prolonged by a conduit and outlet piping (not shown in the drawing) which direct the beverage towards the outside where it is collected in a cup, such as described better in the document WO 99/12456. The hydraulic actuating cylinder 8 described here is a single acting jack, the return to the rest position of the piston of the jack being performed by a spring 11 located in the lower part of the hydraulic actuating cylinder. Such a jack is described in greater detail in the document WO 99/12457.

The appliance also comprises a grounds dispenser 14 that comprises a grinder supplied with coffee beans from a reservoir. The coffee beans fall into the grinder and leave in a ground state through a dispensing opening through which the ground coffee passes into a chute 15 in the shape of a ski jump that directs it towards brewing chamber 2, which it enters through an orifice called opening 3 of the chamber. In an alternative, the ground coffee can be sent into the chamber from a ground coffee reservoir while passing through a dosing device. In another alternative of the invention, the brewing chamber receives a packaged coffee capsule coming from a supply of capsules.

At the end of the brewing preparation cycle, coffee grounds puck 17 present in brewing chamber 2 is pushed to the upper part of the chamber by an ejecting plate (not shown in the drawings) movably mounted inside the chamber while being actuated by an ejection rod 19 that passes through thermal block 4. Ejection rod 19 is connected to the ejecting plate and is actuated by a driving mechanism. As an example, this driving mechanism can comprise a transverse rod connecting the lower end of vertical ejection rod 19 to the return movement effected by spring 11 of hydraulic actuating cylinder 8. The ejecting plate then carries out the same vertical sliding movement to the top as pressing plunger 5 and at the same time as the latter, as described in the document WO 99/12457.

A device 20 for ejection of pucks 17 is then placed in operation by the machine. For this purpose, ejection device 20 comprises an ejector arm 21 comprising an end 22 called stabilizing and a scraping part 27 that pushes the puck starting from opening 3 of brewing chamber 2 towards a passage emerging into a grounds tank (not shown in the figures) that stores used pucks.

According to the invention, ejector arm 21 is driven in movement by a cam 30 belonging to an ejector guide 31 fixed on support 10 for jack rod 9, the ejector guide and thus cam 30 being movable with the latter. Ejector arm 21, itself, is mounted to rotate around a vertical pivot axis 24 carried by a horizontal intermediate support 25 fixed to the machine. A drive end 23 of ejector arm 21 forms a fork 26 coming to engage with cam 30.

Figure 2:
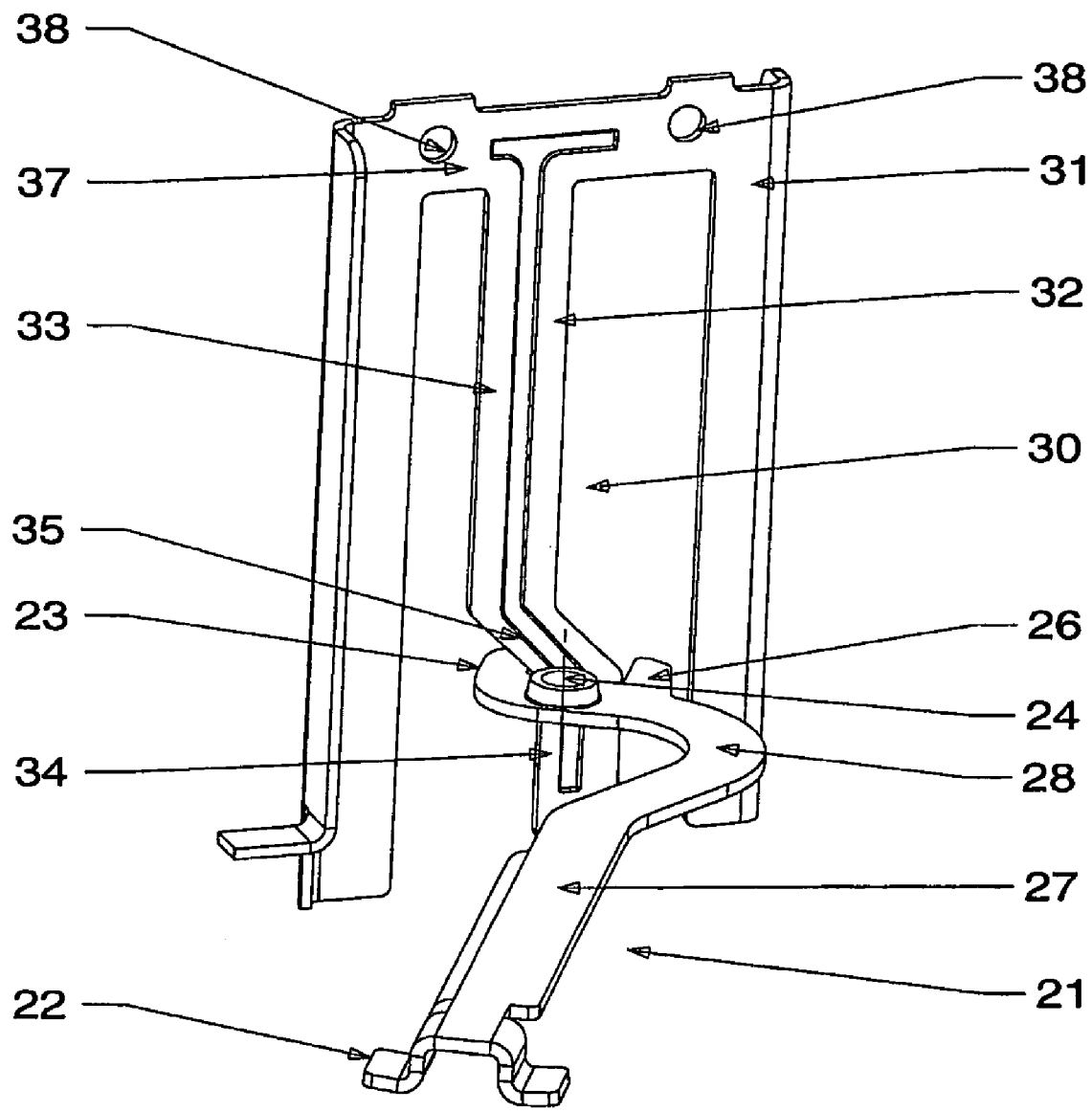
FIG. 2 is a perspective view an assembly of an ejector arm and cam for actuation of the latter according to the present invention.

In FIG. 2 is more clearly shown, to a larger scale, only the unit formed by cam 30 and ejector arm 21. The stabilizing end 22 of ejector arm 21 is constituted by a scraping blade of inverted U-shape, which comes to bear with rubbing on the edges of an intermediate part surrounding opening 3 of brewing chamber 2. Viewed from above, ejector arm 21 presents, starting from its stabilizing end 22, a straight front part forming scraping part 27 having a length corresponding to the distance between the periphery of jack rod 9 and that of brewing chamber 2. Front part 27 for scraping or sweeping is prolonged by an elbow 28 that horizontally surrounds jack rod 9. Elbow 28 is terminated by fork 26 forming the drive end 24 of ejector arm 21. Ejector arm 21 is thus a lever, mounted to rotate in a horizontal plane, around vertical pivot axis 24. Ejector arm 21 has, in its scraping part 27, an L-shaped cross section conferring greater rigidity to it, the lateral side of the L coming in contact with the puck. Ejector arm 21 is preferably produced by cutting and bending a metal plate of steel. Fork 26 is, itself, made preferably of a plastic material having good sliding properties, for example of POM, by being overmolded on the metal part of ejector arm 21 or fixed at the end of the latter.

Cam 30 presents a guide path 32 (FIG. 2) held within ejector guide 31. Guide path 32 presents a first straight part 33 in the upper part connected to a second straight part 34 in the lower part. First straight part 33 is parallel to second straight part 34 to which it is connected by an oblique part 35. In the example shown, the oblique part 35 forms an angle of 45° with the straight parts 33,34. Such an oblique part then allows a range of movement of approximately 50 mm for the stabilizing end 22 of an ejector arm 21 having a length of approximately 110 mm, which ensures a complete sweeping of opening 3 of brewing chamber 2 and thus a complete evacuation of the used grounds.

Ejector guide 31 has the form of a U-shaped framework, guide path 32 being connected to a cross piece 37 at the upper part of ejector guide 31. Cross piece 37 is provided with openings 38 for fastening to support 10 of jack rod 9. Ejector guide 31 and cam 30 are preferably produced by cutting and bending a single metal sheet of steel. Advantageously, guide path 32 and cross piece 37 can be covered with a plate made of a plastic with a low coefficient of friction, for example of POM, molded with the base plate of ejector guide 31. In order to avoid any risk of jamming of fork 26 of ejector arm 21 along the path of cam 32, the edges of the latter (or of its plate covering it opposite the fork) are rounded, for example according to a radius of curvature of approximately 3 mm.

In operation, at the start of a coffee cycle, ejector guide 31 and ejector arm 21 are in their initial positions, in particular ejector guide 31 is in its raised position and ejector arm 21 completely to the left of opening 3, as shown in FIG. 1, fork 26 of the latter being on the second straight part 34 of cam 30. The beginning of the cycle starts with the introduction of ground coffee into brewing chamber 2 via chute 15 of grounds dispenser 14. Then, by introducing water into hydraulic actuating cylinder 8 via a pump of the machine, the assembly formed by jack rod 9, support 10, pressing plunger 5 and ejector guide 31 descends. At the beginning of the descent of this unit, cam 30 of ejector guide 31, in particular the oblique part 35 of the cam, allows the rotation of ejector arm 21 completely to the right in FIG. 1 with respect to opening 3 of chamber 2. Ejector arm 21 remains fixed in this position during the making of the coffee, fork 26 being engaged with the first straight part 33 of cam 30. When the making of the coffee is finished, hydraulic actuating cylinder 8 allows upward movement of the assembly, as well as upward movement of the ejector plate inside the brewing chamber, under the action of ejection rod 19, which causes puck 17 to move up to the level of opening 3 of brewing chamber 2. As soon as puck 17 is at the level of opening 3, fork 26 of the ejector arm is actuated by the oblique part 35 of cam 30, which causes a fast rotational movement towards the left of scraping part 27 of ejector arm 21, which thus pushes the puck towards a collecting compartment. During the sweeping operation of the ejector arm, the ejecting piston remains in the same position at the upper part of the brewing chamber and it descends only when sweeping has been finished. The machine is then ready to start again a new cycle of preparation of coffee.

Other alternatives and embodiments of the invention can be envisioned without leaving the framework of its claims.

Such a sweeping ejection device can also be used for the ejection of a pre-packaged capsule containing coffee or another infusion product, the capsule being able to be of the rigid type requiring a perforation for infusion or of the flexible dosette type of filter paper.

The invention claimed is:

1. Automatic dispenser of beverages brewed starting from coffee powder or packaged capsules, in combination with a pressing plunger, comprising, inside a housing:
   an infusion group (1) comprising a brewing chamber (2) presenting a bottom and an opening (3) and being adapted to receive said pressing plunger (5), means for actuation (7) in a relative sliding movement of said pressing plunger (5) relative to said brewing chamber (2), starting from a rest position in which the plunger is outside the chamber to a work position inside the brewing chamber, and an ejector plate movably mounted in said brewing chamber (2), between the bottom and the opening (3) of the brewing chamber by means of a driving device;
   as well as a device (20) for ejection of discs of grounds or infused capsules, when said ejector plate is brought to the level of the opening (3) of the brewing chamber (2), comprising an ejector arm (21) driven in a reciprocating motion above the opening (3) of the brewing chamber, wherein the ejector arm (21) is mounted to rotate around a pivot axis (24) perpendicular to the plane of the opening (3) of the brewing chamber (2) and the ejector arm is entrained in its reciprocating motion by only one cam (30) fixed to, and movable with, the pressing plunger (5), wherein the cam comes to engage directly with a drive end (23) of the ejector arm and has a profile such that the cam ensures displacement of the ejector arm in two opposite directions, and
   wherein said bottom of said brewing chamber constitutes a support surface for ground coffee and said pressing plunger is operative to press the ground coffee against said support surface when in the work position, and
   wherein the pivot axis (24) of the ejector arm (21) is adjacent the drive end (23) of said arm (21), the cam (30) presents a guide path (32), and the guide path (32) is a rib on which moves a fork (26) forming the drive end of the ejector arm (21).

2. Dispenser according to claim 1, wherein the cam (30) is flat.

3. Dispenser according to claim 2, wherein the guide path (32) is composed of two straight parallel parts (33,34) and connected together via an oblique part (35) forming an angle ranging between 40° and 60° with said straight parts.

4. Dispenser according to claim 1, wherein the rib is covered with a plate with round edges made of a plastic.

5. Dispenser according to claim 4, wherein the means (7) for actuation of the pressing plunger (5) comprise a hydraulic actuating cylinder (8) comprising a jack rod (9) provided at the one of its ends with a support (10) which carries said pressing plunger (5) and the cam (30).

6. Dispenser according to claim 5, wherein the cam (30) is held within an ejector guide (31) fixed at the one of the ends of the support (10) opposed to that carrying the pressing plunger (5).

7. Dispenser according to claim 1, wherein the means (7) for actuation of the pressing plunger (5) comprise a hydraulic actuating cylinder (8) comprising a jack rod (9) provided at the one of its ends with a support (10) which carries said pressing plunger (5) and the cam (30).

8. Dispenser according to claim 7, wherein the cam (30) is held within an ejector guide (31) fixed at the one of the ends of the support (10) opposed to that carrying the pressing plunger (5).

* * * * *